(12) United States Patent
Fujita-Yuhas

(10) Patent No.: US 8,036,357 B2
(45) Date of Patent: Oct. 11, 2011

(54) ADDING AN IDENTIFIED CALLER'S OTHER DEVICES TO A VOICE MAIL SYSTEM

(75) Inventor: Tim Fujita-Yuhas, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1145 days.

(21) Appl. No.: 11/407,422

(22) Filed: Apr. 19, 2006

(65) Prior Publication Data

US 2007/0263792 A1      Nov. 15, 2007

(51) Int. Cl.
*H04M 3/00* (2006.01)
*H04M 1/64* (2006.01)

(52) U.S. Cl. .................. 379/198; 379/88.19; 379/88.25

(58) Field of Classification Search ............... 379/88.16, 379/88.18, 88.26, 88.27
See application file for complete search history.

(56) References Cited

U.S. PATENT DOCUMENTS

| | | | | |
|---|---|---|---|---|
| 6,449,342 | B1 * | 9/2002 | Johanson .................... | 379/88.11 |
| 6,590,965 | B1 * | 7/2003 | Poole et al. ................. | 379/88.19 |
| 6,741,679 | B1 * | 5/2004 | Malik ......................... | 379/88.19 |
| 7,170,983 | B2 * | 1/2007 | Gruchala et al. .......... | 379/142.02 |
| 7,200,218 | B1 * | 4/2007 | Lindley et al. ............. | 379/221.11 |
| 7,664,636 | B1 * | 2/2010 | Hirschberg et al. ........... | 704/231 |
| 2003/0059007 | A1 * | 3/2003 | Beyda ....................... | 379/88.19 |
| 2003/0068019 | A1 * | 4/2003 | Colemon .................... | 379/88.19 |
| 2005/0186945 | A1 * | 8/2005 | Mazor ......................... | 455/413 |
| 2006/0062359 | A1 * | 3/2006 | Pearson ..................... | 379/88.17 |
| 2006/0140200 | A1 * | 6/2006 | Black et al. ................. | 370/401 |

OTHER PUBLICATIONS

Cisco Systems: "Cisco Unity Connection" Introduction (one page) from: http://www.cisco.com/en/US/products/ps6509/index.html.
Cisco Systems: Cisco Unity Connection "Cisco Unity Connection Supported Platforms List"(13 pages) from: http://www.cisco.com/en/US/products/ps6509/products_data_sheet0900aecd80372879.html.
Cisco Systems: "Cisco Unity Connection 1.1" data sheet (five pages) from: http://www.cisco.com/en/US/products/ps6509/products_data_sheet0900aecd80313ab1.html.
Cisco Systems: "Cisco Unity Connection User Guide", release 1.x, Published Nov. 11, 2005 (172 pages).
Cisco Systems: "Introducing Cisco Unified Communications System Fundaments" By Brian Morgan, Moises Gonzales, Sample Chapter, Date: Sep. 16, 2005 ( six pages).
Techworld "Cisco dials SIP in VoIP U-turn" by Stephen Lawson, IDG News Service (seven pages) from: http://www.techwolrd.com.

* cited by examiner

*Primary Examiner* — Fan Tsang
*Assistant Examiner* — Solomon Bezuayehu
(74) *Attorney, Agent, or Firm* — Marger Johnson & McCollom, P.C.

(57) ABSTRACT

A method and system for registering external telephone numbers and associating such external telephone numbers with an extension in a voice mail system. When a call is received from a telephone which is not registered in the called systems database, after the caller has identified an extension and entered an appropriate password, the user is given an opportunity to register the external telephone with the system and to associate the telephone with and extension in the called system.

20 Claims, 2 Drawing Sheets

ADDING AN IDENTIFIED CALLER'S OTHER DEVICES TO A VOICE MAIL SYSTEM

FIELD OF THE INVENTION

The present invention relates to telephone systems and more particularly to voice mail systems.

BACKGROUND

Voice mail systems are in widespread use. Voice mail systems can be used with conventional POTS telephone systems (Plain Old Telephone Service) and/or with the more modern VoIP (Voice over Internet Protocol) systems.

Some older voice mail systems merely function as a telephone answering machine. That is, they answer calls and record messages when an extension is not answered. Many more modern voice mail systems are closely integrated with, and they form an integral part of a PBX system (Private Branch Exchange). Such voice mail systems can provide many more functions than do the older type of voice mail systems. For example, in many modern voice mail systems when a user calls into voicemail from a telephone extension attached to the PBX, the number of the extension from which the call was placed is automatically recognized by the voice mail system.

A modern voice mail system can be associated with a single PBX or with a number of interconnected PBX systems, and the PBX systems can be either POTS systems, VoIP systems or a combination of such systems. Modern voice mail systems can also facilitate the interconnection of telephones not directly connected to a PBX system. Such systems can provide both the conventional functions of an answering machine along with a wide variety of related functions. For example, in many such systems when a voice mail message is left for one person from another person connected to the same system, the system automatically identifies the message as being from the person assigned to the extension that placed the call.

Many modern telephone handsets include a display. The display can be used to identify the calling party, that is, a caller ID function, and to display other text messages. Typically, for extensions connected to the system, a caller's name is displayed on the called party's handset.

Modern voice mail systems typically include a database that stores subscriber information. If a call originates from a telephone number that is identified in the database, the call is said to originate from an "identified caller" and the caller's name is displayed on the called handset. Furthermore the identified callers name is automatically associated with any messages the caller leaves. If a call is made from a telephone number that is not identified in the system's database, the call is said to originate from an "unidentified caller" and the caller's name cannot be displayed or associated with any messages that are left.

In modern voice mail systems, users and the system administrator have access to the system's database by means of a web based interface. That is, using a conventional browser and conventional web page access methods, users and the administrator can add or delete information from the system's database.

Using the web based interface a user can identify external telephone numbers (those not directly connected to the PBX) so that calls from such telephones are thereafter treated as calls from an "identified" party. For example, a user could enter into the database the telephone number of his cell phone, mobile phone, etc. Calls from such telephones would then be calls from an identified party. Once the number of such a telephone has been entered into the database, if a caller from such a telephone places a call to an extension connected to the system and leaves a message, the messages is automatically marked as originating from the caller in the same way that it would be identified if it originated from the callers extension on the system.

In many existing system, there are also additional benefits that can be achieved by users who have registered non PBX associated telephone devices. For example, the recipient of a message can reply to the message without entering the caller's number. Another benefit is that a user may be able to group all messages from a particular caller together for achieving or searching even though they originated from different devices.

The retrieval of messages from an external telephone is also facilitated if the external telephone has been registered in the system's database. If a user is using a PBX associated telephone, recorded messages are typically retrieved by pressing a message button and entering a password. The voice mail system knows which messages to retrieve because it identifies the user by the extension being used. Furthermore, the user need only enter a password. The user does not have to identify the extension since the system knows the extension from which the call originated.

In order to retrieve messages from a telephone that is not associated with a particular PBX voice mail system, a user generally calls a message retrieval telephone number, and the voice messaging system prompts for the user's extension and the user's password. If the external telephone number has been registered in the system's database, the system recognizes the user who is calling and the system merely needs prompt for the user's password, and not for the user's extension.

There are many different types of voice mail systems that are commercially available, each of which has a particular set of available features. Some commercially available systems have some but not all the functions described above. A commercially available system that implements all of the above features (and others) is the voice mail system available from Cisco Systems Inc. under the trademark Unity™.

The present invention is directed to a feature for a voice mail system that facilitates registering external telephones with a voice mail system so that the system can recognize calls from such telephones and eliminate the need to prompt for an extension number.

SUMMARY

The present invention provides a method and system for registering external telephone numbers and associating such external telephone numbers with a user's account in a voice mail system. When a call is received from a telephone which is not registered in the called system's database, after the caller has logged into the system by providing an extension number or ID, and entered an appropriate password, the user is given an opportunity to register the external telephone number with the system and to associate the telephone number with an extension that is associated with the user's account in the called system.

DETAILED DESCRIPTION

Figure 1:
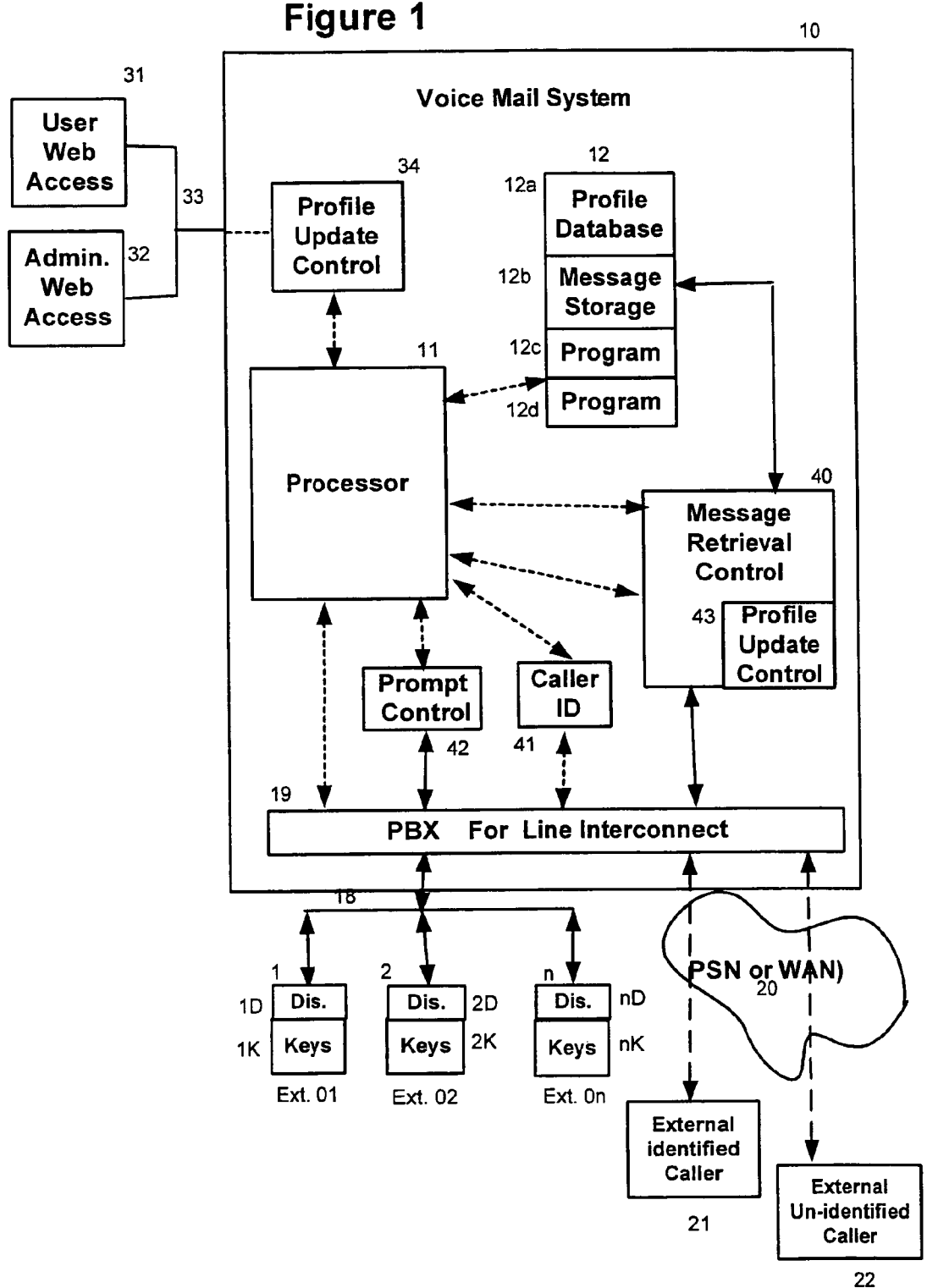
FIG. 1 is an overall block diagram of a first embodiment of the invention.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate a preferred embodiment of the invention and the operation of such embodiment. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

FIG. 1 is a block diagram of a first preferred embodiment. This first embodiment is an integrated VoIP PBX and voice mail system 10 that interconnects a number of extensions. For convenience of illustration, only a few extensions, designated 01 to 0n, are shown in FIG. 1; however, it should be understood that the system can have any number of such extensions up to the system's capacity as is conventional. Each extension has an associated conventional VoIP handset 1 to n. Each handset 1 to n includes a display, respectively designated 1D to nD, and an associated keyboard, respectively designated 1K to nK. Extensions 01 to 0n are connected to the system 10 in a conventional manner by LAN 18. These extensions can be interconnected by a conventional PBX 19.

The system 10 includes a conventional digital processor 11 that has an associated conventional memory 12. Memory 12 has stored therein, a profile database 12a, messages 12b, conventional programs 12c, and added program 12d. Profile database 12a contains a profile associated with each of the extensions 1 to n. Processor 11 executes programs 12c and 12d as is conventional and it controls the other units in the voice mail system 10. Programs 12c and 12d access the data stored in database 12a and the messages stored in message storage 12b. Program 12c provides conventional voice mail functions. Program 12d provides the additional functions as described below.

Two work stations 31 and 32 are connected to system 10 through a conventional local area network 33. Work stations 31 and 32 are conventional computers that can access the profile database 12a via a profile update control mechanism 34. Profile Update control 34 could for example be a conventional web server. It is noted that for convenience of illustration only two work stations are shown and explained; however, the system can include any number of such work stations as is conventional. Some of the work stations can be in the same general area as system 10 and connection to system 10 through a conventional Local Area Network (LAN) and others can be remotely located and connected through a Wide Area Network (WAN). While two separate LANs 18 and 33 are shown in FIG. 1, it is noted that these could be the same LAN.

System 10 includes a second profile update control designated 43. Profile update control 43 operates as part of a message retrieval control 40 which is described below and illustrated in FIG. 2. It is noted that while profile update controls 34 and 43 are shown as separate units in FIG. 1, these units could be implemented by processor 11 executing an appropriate program.

FIG. 1 also shows two remote telephones designated 21 and 22. Telephones 21 and 22 can be either POTS telephones, wireless cellular telephones, or remotely connected VoIP telephones. In FIG. 1, dotted lines are shown between phones 21 and 22 and system 10 to illustrate that telephones 21 and 22 are connected to the system 10 through the public switched network 20. Alternately, if telephones 21 and 22 are VoIP telephones, they would be connected to the system 10 through a WAN such as through the Internet. Only two externally connected telephones 20 and 21 are shown; however, it should be understood that there can be an unlimited number of such phones from which calls can be placed to system 10.

The message retrieval control unit 40 enables callers on extensions 01 to 0n or on external telephones 21 and 22 to access messages stored in message storage 12b. From handsets 1 to n on extensions 01 to 0n, messages are retrieved by pressing a designated key and entering a password. The system compares the entered password to a password stored in the extensions profile and if they match access is provided to the user's account associated with the extension as is conventional. Once access to the account has been given, stored messages can be retrieved. Stored messages can also be retrieved from an external telephone by calling a special messaging system access number (herein referred to as a message retrieval telephone number) as described below.

Each extension attached to the system, that is, extensions 01 to 0n has a profile stored in database 12a. The profile associated with each extension stores various information about the normal or assigned user of the associated extension. The stored information can include the user's name and a message retrieval password. The profile can also include the telephone number of external telephones. Such external telephones are referred to as registered telephones and calls from such telephones can be handled as if they came from the user's PBX associated extension. The profiles in profile database 12a can be accessed and updated from work stations 31 and 32 in a conventional manner.

When a call is paced between two extensions on the system, for example, from extension 01 to extension 02, the name of the calling party is displayed on the display screen of the called party. If a call is placed to an extension from an external telephone (this is not registered with the system), a voice message left by the caller can not be automatically identified as being from the caller and thus the system can not automatically give the caller's name when the message is retrieved. As noted above, a caller whose name is known to the system is herein referred to as an "identified caller". A caller whose name is unknown to the system is herein referred to as an "unidentified caller". The telephone number of external telephones can be stored in a user's profile in database 12a, so that calls from such external telephones are treated as calls from identified users.

The system also includes a prompt control 42 and a caller ID unit 41 (sometimes referred to in the art as ANI). Prompt control 42 issues prompts to callers on extensions 01 to 0n or to callers from external phones 21 and 22. Caller ID 41 automatically detects the number of external telephones that call into the system. Prompt control 42 and caller ID unit 41 are conventional.

These devices can be implemented as separate devices or a program subroutines executing on processor 11. Prompt control unit 42, caller ID unit 41, profile update control 43 and message retrieval unit 40 all operate under control on processor 11.

Work stations 31 and 32 can access profile database 12 and register particular external telephone numbers so that voice messages that originate from such telephone numbers can be treated as identified callers messages. That is, the profile associated with a particular extension can contain the identity of external telephones and indicate that calls from these external telephones should be treated as if they originated with a particular extension on the system. For example, if a particular user has a cellular telephone, the number of the cellular phone can be registered in database 12*a* in the profile of the particular user's extension. When a call is received from that particular cellular telephone, the system handles it as if it originated from the user's extension on system 10. When an external telephone number is stored in an extension's profile, the external telephone number is said to be registered.

When the system receives a call from an external telephone, the system utilizes conventional caller ID unit 41 to identify the number of the external telephone. If this number has been registered in profile database 12*a*, the system treats the external call as is it had come from the extension associated with the calling telephone in the profile database 12*a*. The novel manner in which the system can facilitate registration of external telephones so that they become identified callers is explained below.

Calling the message retrieval telephone number initiates a message retrieval process as explained below. If a call to the message retrieval number is from a telephone such as telephone 21, the number of which has been stored in database 12*a*, the system uses a conventional caller ID mechanism to identify telephone 21 and it merely asks for the password of the mailbox from which messages are to be retrieved. If on the other hand a call is placed to the message retrieval number from a telephone such as telephone 22, the number of which has not been registered in database 12*a*, the system first asks for the number of the mailbox from which messages are to be retrieved and it then asks for the password of the identified mailbox. The system also asks the caller if the telephone from which the call is being made should be registered with the system. This process is explained in more detail below with reference to FIG. 2.

Programs 12*c* and 12*d*, together with database 12*a*, message storage 12*b*, and processor 11 control the system so that the system can perform various functions described herein. Program 12*c* and programs 12*d* are shown separately in the drawing in that program 12*c* performs conventional voice mail functions that are only summarily described herein. Program 12*d* controls the system to perform the functions performed by this first embodiment of the invention which are not part of conventional voice mail systems.

In the prior art, external telephones are registered in the systems database using various types of terminals that access the system's database and update profiles associated with the systems extension. With the present invention an external telephone number can be registered with the system when a call is made to the system's message retrieval number and the appropriate extension number and password are entered.

Figure 2:
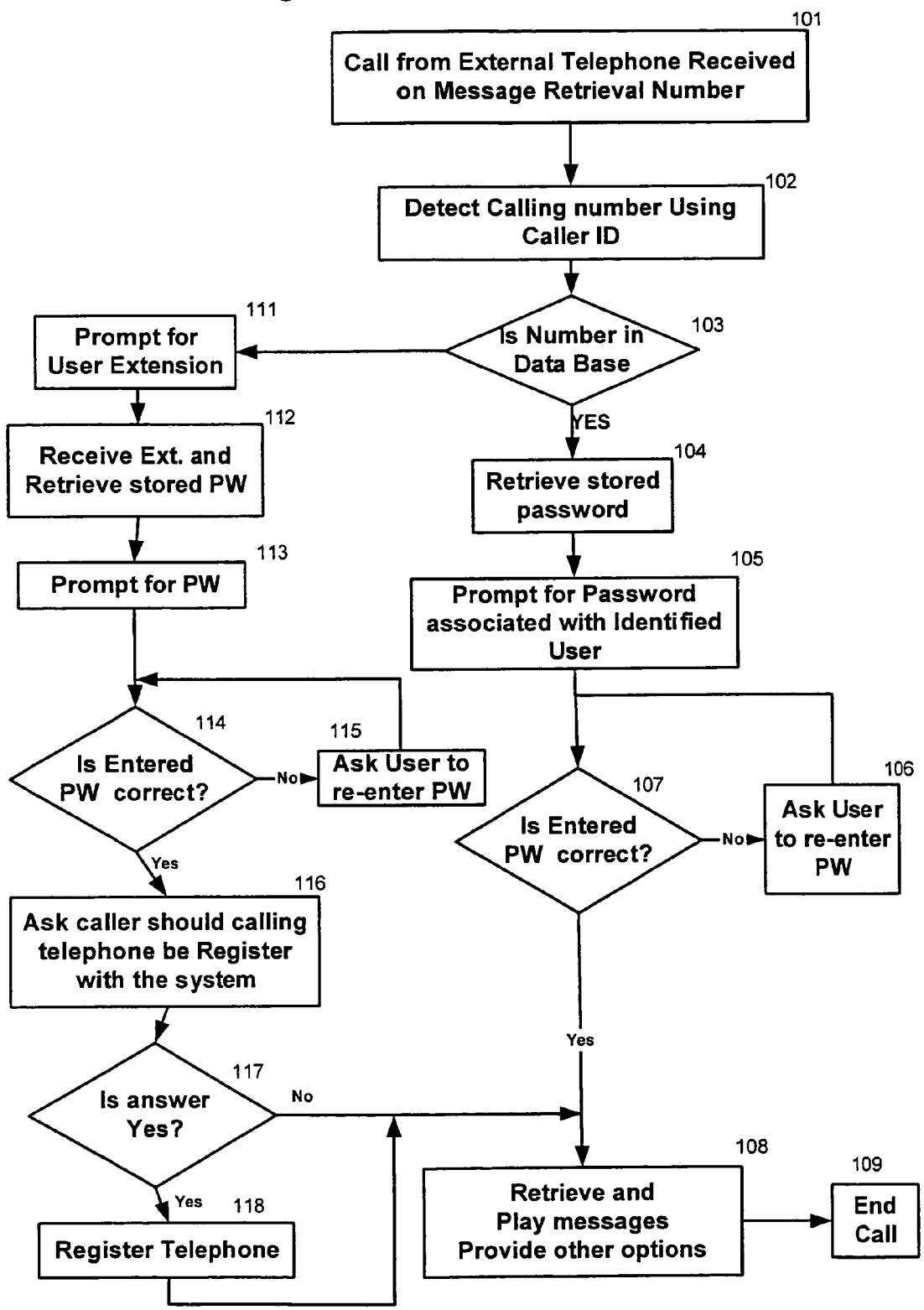
FIG. 2 is a flow diagram illustrating the operation of the system.

The process for registering an external telephone in the systems database is illustrated in FIG. 2. The process begins when a call is received on the system's message retrieval telephone number as indicated by block 101. In a conventional manner, using caller ID, the system detects the telephone number of the calling telephone as indicated by block 102.

Next, as indicated by block 103, a check is made to determine whether or not the calling telephone number is in the system's database 12*a* as a registered telephone. If the number of the calling telephone is in database 12*a*, that is, if the number of the calling telephone has been previously entered into the profile of one of the system's extensions, the system does not need to ask the caller for an extension. The system will know the extension from the identity of the profile where the calling telephone was registered.

In this case, as indicated by block 104, the system retrieves the password associated with the identified extension and immediately prompts the caller to enter a password as indicated by block 105. As s conventional, and as indicated by blocks 106 and 107, a check is name to insure that the calling party has entered the correct password.

If the password was entered correctly, the messages will be retrieved as indicated by block 108. After access to the user's account has been granted by the system, the caller may be given other options as is conventional. For example the caller may be asked whether or not the message should be deleted. When all calls have been played and all the options entered by the caller have been executed, the call ends as is conventional and as indicated by block 109.

The operations that occur if the calling number was not previously registered with the system are indicated by blocks 111 to 118. If at the point in the process indicated by block 103, the system determines that the calling number is not in the system's database, the caller is prompted for the extension associated with the messages that he would like to retrieve as indicated by block 111. Once the system has the number of the extension, it will retrieve the associated password as indicated by block 112 and prompt the caller for the password as indicated by block 113. Checks are made to insure that the password is correct as indicated by blocks 114 and 115.

As indicated by block 116, if the correct password was entered, the caller is asked whether or not the calling telephone should be entered into the profile of the extension entered by the caller. If the answer is "yes" the telephone is registered so that subsequent calls from the same telephone can be handled as calls from an identified caller. If the caller answers "yes", the calling telephone number is entered into the profile of the identified extension as a registered telephone as indicated by block 118. If the answer is "no" or after the telephone has been registered, as indicated by block 118, the account is accessed and messages are retrieved and played as indicated by block 108. After an account has been accessed as described above, the caller may be given other options as is conventional. For example, he may be asked if the message should be erased or achieved and if he wants to compose a message for another user on the system. Finally the call is ended as indicated by block 109.

It is noted that once an external telephone is registered with the system, voice messaging system access requests from the registered external telephone are treated in the same way as requests from the extension associated with said external telephone. Furthermore all other available voice messaging and PBX integrated functionally is now available from such an external telephone as if it were a directly connected extension. From an extension connected to the system, a user merely presses a particular key (or combination of keys) in order to ask the system to retrieve stored messages. The system then prompts for the password stored in the profile of said extension. This is conventional. Once an external telephone is registered in the profile of an extension, requests to retrieve messages from said external telephone are treated in the same manner as requests from the associated extension. That is, the system merely prompts for a password.

Furthermore, once an external telephone is registered in the extension or user's profile they can receive other benefits that user's of directly connected extensions receive. For example, if a user on one extension directly connected to the PBX leaves a message for another a user on a different extension directly connected to the PBX, the voice mail system automatically associates the caller's name with the message that is left and announces it when the message is retrieved.

It is also noted that once an external telephone is registered in the profile of a particular user, calls from that external telephone to other extensions are treated in the same way as calls from the associated extension, that is, the caller's name is stored with the stored message. Otherwise the caller's name is recorded as unknown or unidentified.

In alternate embodiments, the prompt, asking if the telephone number should be registered occur at different points in the flow diagram. It is also noted that the prompts can ask for ether a voice response (that would be recognized by conventional voice recognition logic) or for an input by pressing keys. Thus either a voice response of a key entry can be used to provide user input that the system will recognize and proceed accordingly. Various and sundry other changes can be made in the flow diagram, without departing from the process whereby a call from an external telephone provides an opportunity to register that telephone with the system.

It is noted that in another alternate embodiment, the registration of a telephone can result in a wide variety of other actions. For example it can be used as the identity of a telephone to which SMS messages are sent giving notice that a message has been recorded. It can be used as the number to which message notification calls are made by the voice mail system. In still another embodiment, the number registered as a result of a call from an external telephone can be used as a number to which messages are forwarded. In yet another embodiment, the registered external telephone number is used to play back message recordings that are accessed using a graphical interface client to select particular messages for payback.

In still anther embodiment, the system receives requests from devices such as from a "Blackberry" device via the Internet to call the telephone device back and play particular voice message. In yet other embodiments the system stores the URL of the device rather than the telephone number.

It is noted that any type of external telephone that is capable of connecting to the PBX via the public switched network or via a voice over IP network and which has an assigned telephone number can be registered as described above. All such device with are capable of connecting to a PBX via either the public switched network, a voice over IP network, or via some other type of connection are herein termed external sources.

It is noted that herein, the profiles stored in the data base can be said to be either associated with a particular extension or to be associated with a particular user who has a particular assigned extension. Each profile stored in the data base is a profile for a particular user account or for a particular extension connected to the system.

It should be noted, that in addition to the special functions described in detail above, system 10 can perform normal voice mail and PBX functions. For example the system can perform the various PBX and voice mail functions performed by the voice mail system marketed by Cisco Systems Inc. under the trademark "Unity" together with various other commercially available programs. The publicly available literature on the Unity voice mail system and in particular the publication entitled "Available Features in an Integration of Cisco Unity with Cisco CallManager 3.0 and Avaya Definity G3 (Unity Version 2.4(6))" is hereby incorporated herein in its entirety by reference.

While the invention has been shown and described with respect to preferred embodiments thereof, it should be understood that a wide variety of other embodiments are possible without departing from the scope and sprit of the invention. The scope of the invention is only limited by the appended claims.

I claim:

1. A method of registering an external source in a voice mail system that includes a plurality of extensions, said method comprising:
    receiving a call from a user via an external source,
    detecting an identity of said external source,
    determining whether said external source is registered with said voice mail system based on said identity,
    if said external source is not registered with said voice mail system, prompting said user to identify a particular extension,
    responsive to receiving said particular extension identified by said user, retrieving a stored password associated with said particular extension and prompting said user to provide the associated password,
    if said provided password is correct, prompting said user to determine if said external source should be registered with respect to said particular extension,
    if said user indicates that said external source should be registered, registering said external source with respect to said particular extension by entering said identity of said external source into a profile associated with said particular extension, said profile comprising a caller's name,
    receiving a subsequent call from the user via the external source, wherein the subsequent call is intended for other user, and
    storing a message from the user for the other user, wherein the storing comprises associating the caller's name with the message.

2. The method recited in claim 1 wherein said external source is an external telephone that is connected to said system via a connection that is a member of a class of connections that includes the public switched network and the Internet.

3. The method recited in claim 1 wherein said external source is an external telephone and said identity of said external source is the telephone number of said external telephone.

4. The method recited in claim 1, wherein said password is stored in said profile and where there is a plurality of users, each of which is associated with a particular profile.

5. The method recited in claim 1, wherein said external source is a cellular telephone.

6. The method recited in claim 1, wherein said external source belongs to a class that includes cellular telephones, mobile telephones, Voice over Internet Protocol (VoIP) telephones and Plain Old Telephone Service (POTS) telephones.

7. A method of registering an external source in a voice mail system that includes a plurality of extensions and that records telephone messages directed to said extensions, each particular extension having a profile that stores a caller's name and a password required to retrieve recorded messages associated with said particular extension, said method comprising:
    receiving a request from a user utilizing an external source to retrieve recorded messages associated with a particular extension,
    asking said user for the an identity of said particular extension,
    asking said user for a password and comparing the provided password to the password in the profile of said particular extension,
    detecting an identity of said external source, asking said if the external source should be registered in the profile of said particular extension, if said user answers "yes," registering the identity of said external source in the profile of said particular extension, whereby future requests from said external source if automatically associated with said particular extension, subsequent to the registering, receiving a call from the user utilizing the external source, and storing a message from the user for another user resulting from the call, the storing comprising associating the caller's name with the message.

8. The method recited in claim 7 wherein said external source is a telephone that is external to said voice mail system.

9. The method recited in claim 7 wherein when an external source is registered in said system, subsequent calls from said external source only ask for a password prior to gaining access to the voice mail functions of said system.

10. The method of claim 7 wherein said external source is a telephone that is external to said voice mail system and wherein a registered external source is a registered external telephone.

11. The method of claim 10 wherein a request for stored messages from a registered external source is treated in the same way as a request for stored messages from an extension associated with said external telephone number.

12. A voice mail system comprising:
a plurality of extensions,
a plurality of stored profiles, wherein each profile is associated with at least one of the extensions and wherein each profile provides the name of a user associated with the profile and a password,
a caller ID mechanism operable to detect a telephone number of an external telephone calling said voice mail system,
a prompter for prompting a caller from the external telephone if the external telephone should be registered in said voice mail system, and
a registering system for registering said external telephone by storing the telephone number of said external telephone in one of said profiles if said caller answers yes to said prompt,
subsequent to the registering, receiving a call from the user unitizing the external source, and storing a message from the user for another user resulting from the call, the storing comprising associating the caller's name with the message.

13. The voice mail system recited in claim 12 further comprising a message storage device for storing messages directed to a particular extension, wherein said message storage device is operable to automatically record with a message the name of the user leaving the message based on the one of said profiles.

14. The voice mail system recited in claim 12 further comprising a message retrieval control unit for retrieving stored messages associated with a particular external telephone in response to a call from said external telephone that identifies a particular extension and provides a password associated with said particular extension.

15. The voice mail system recited in claim 14 including a profile update control mechanism to update the one of said profiles in response to a call from another external telephone.

16. Logic for registering an external source in a voice mail system that includes a plurality of extensions, said voice mail system having a stored password associated with each extension, said logic encoded in one or more non-transitory media for execution and when executed is operable to:
receive a call from a user via an external source,
detect the identity of said external source,
prompt said user to identify a particular extension and to provide the associated password,
if said password is provided correctly prompt said user to determine if said external source should be registered with respect to said particular extension,
if said user indicates that said external source should be registered, register said external source with respect to said particular extension by entering said identity of said external source into a profile associated with said particular extension, said profile comprising a caller's name,
receiving a subsequent call from the user via the external source, wherein the subsequent call is intended for other user, and
storing a message from the user for the other user, wherein the storing comprises associating the caller's name with the message.

17. The logic recited in claim 16, wherein said external source belongs to the class that includes, cellular telephones, mobile telephones, VoIP telephones and POTS telephones.

18. The method recited in claim 1, further comprising:
the other user retrieving the stored message, and
the voice mail system announcing the caller's name to the other user responsive to the retrieving.

19. The method recited in claim 7, further comprising:
the other user retrieving the stored message, and
the voice mail system announcing the caller's name to the other user responsive to the retrieving.

20. The voice mail system recited in claim 13, further comprising a message retrieval control unit for allowing another user to retrieve a stored message from the caller, wherein the message retrieval control unit is operable to announce the name of the user to the other user responsive to the user retrieving the stored message.

* * * * *

UNITED STATES PATENT AND TRADEMARK OFFICE
CERTIFICATE OF CORRECTION

| | | |
|---|---|---|
| PATENT NO. | : 8,036,357 B2 | Page 1 of 1 |
| APPLICATION NO. | : 11/407422 | |
| DATED | : October 11, 2011 | |
| INVENTOR(S) | : Tim Fujita-Yuhas | |

It is certified that error appears in the above-identified patent and that said Letters Patent is hereby corrected as shown below:

Column 8, line 62, the words "the an" should read -- an --;
Column 9, line 5, the word "if" should read -- is --.

Signed and Sealed this
Sixth Day of March, 2012

David J. Kappos
*Director of the United States Patent and Trademark Office*